Aug. 17, 1943.　　　A. B. NEWTON　　　2,327,208
CONTROL DEVICE
Filed Sept. 15, 1941
Fig.1
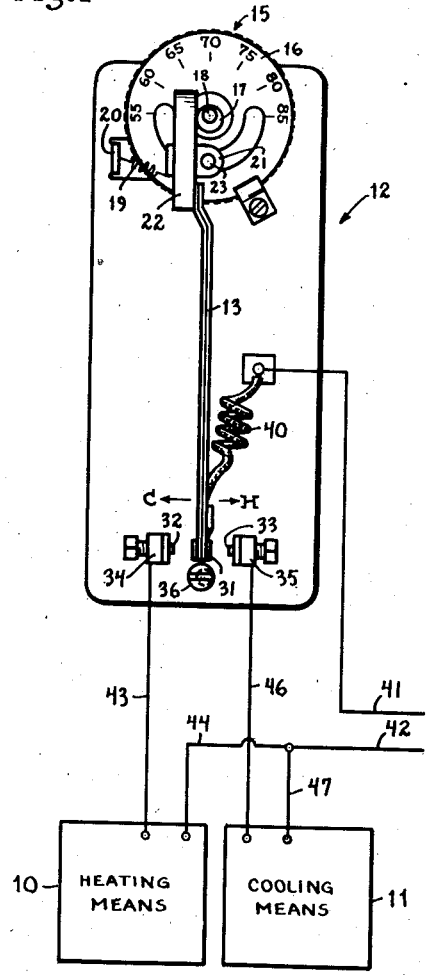
Fig.2
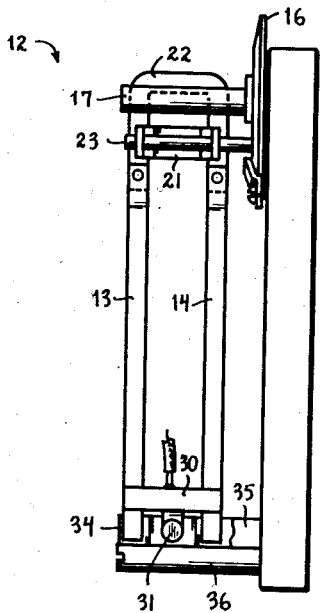
Fig.3
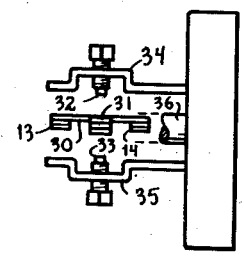
Fig.4
INVENTOR
Alwin B. Newton
BY
George H. Fisher
ATTORNEY Patented Aug. 17, 1943

2,327,208

UNITED STATES PATENT OFFICE 2,327,208

CONTROL DEVICE

Alwin B. Newton, Minneapolis, Minn., assignor to Minneapolis-Honeywell Regulator Company, Minneapolis, Minn., a corporation of Delaware Application September 15, 1941, Serial No. 410,814

20 Claims. (Cl. 200—139)

The present invention relates to a control device and more particularly to a snap acting control switch suitable for automatically controlling heating and/or cooling systems.

An object of this invention is to provide a simplified single magnet snap action switch means which will perform a plurality of control functions.

A second object is to arrange a switch means as set forth in the preceding object so that the conditioning means cannot be operated simultaneously, or closely follow each other, in performing their conditioning functions.

A further object is to provide a novel snap acting switch means for controlling a plurality of conditioning means, which switch means comprises but a single magnet for rendering the same snap acting in controlling both of said conditioning means.

Another object is to provide a novel magnetic snap acting switching means wherein the magnet is located at a distance from the switches and the magnetic flux is carried to an armature adjacent said switches to obtain the snap action.

A still further object is to provide a switching means wherein the ends of a pair of thermostats carrying magnetic flux are snap actuated between a plurality of armatures and a damping means disposed therebetween, to perform a plurality of control functions.

The above and other objects will be either apparent or pointed out in the accompanying specification and claims when read in consideration of the accompanying drawing in which:

Fig. 1 is partly diagrammatic and partly a detail view of the front of my device, together with heating and cooling means, Fig. 2 is a side view looking from the right at the thermostat of Fig. 1, Fig. 3 is a bottom view of the device, and Fig. 4 is a detail view of one form of the magnetic detent.

Referring more particularly to the drawing, a heating means 10 and a cooling means 11 are under the control of a condition responsive device generally indicated by the reference character 12. The condition responsive device 12 may take the form of a thermostat, a humidostat, a pressurestat, or an effective temperature controller.

The device 12 is shown as a thermostat and comprises a pair of bimetallic members 13 and 14. The members 13 and 14 are composed, at least in part, of a ferro-magnetic material, such as, for example, invar. However, it will be understood that any of several ferrous materials could be used, and could comprise both metals of the bimetal if they have different coefficients of thermal expansion.

A manual adjusting means 15 for the thermostat 12 comprises an adjustment dial 16 and a cam 17 carried upon a pivot 18. A spring 19 is secured at one end to an upturned ear 20 formed integrally with the casing and secured at the other end to a bracket 21 pivoted on a pin 23. The bracket 21 secures a magnet 22. By such structure the spring 19 at all times urges the upper end of the magnet 22 into engagement with the adjusting cam 17.

Secured to the lower ends of the bimetallic members 13 and 14 is a bridging piece 30 formed of some suitable electrically conductive material such as brass. The bridging member 30 should be made of a material which will not conduct magnetic flux. A contact 31 is carried by the bridging member 30. The contact 31 is adapted to cooperate with a contact 32 for the heating means 10 and a contact 33 for the cooling means 11. The contacts 32 and 33 are suitably secured on brackets 34 and 35 which are in turn secured to the base of the thermostat 12. The brackets 34 and 35 are made of a ferromagnetic material and are adapted to conduct magnetic flux which travels from the magnet 22 through the thermostatic members 13 and 14.

A magnetic detent 36, in the form of a rotatably adjustable post, is mounted at the bottom of the thermostatic element 12. The detent 36 is likewise made of a ferro-magnetic material and is adapted to carry a flux which comes from the magnet 22 through the thermostatic members 13 and 14.

A flexible conductor 40 is secured to the bridging member 30 and is adapted to supply current to either the heating or the cooling means from the line conductors 41 and 42 which lead to a suitable source of power, not shown.

The device shown in Fig. 4 is a modification of the detent and differs from the device shown in Figs. 1 to 3, inclusive, in that the detent 51 in Fig. 4 is wound with an electrical conducting wire 50 suitably soldered at its ends to the detent 51. With such a construction, when the lower ends of the thermostatic members 13 and 14 snap adjacent thereto, an electrical current will be induced in the coil of wire 50. This current will create magnetism in the detent 51, thereby aiding the magnetic flux carried by the thermostatic members 13 and 14 in damping the action of the lower ends thereof. A further damping action is obtained by this structure due to the fact that the ends of the bimetallic members 13 and 14 will expend their force as the coil 50 cuts through the lines of magnetism. Therefore, it is seen that the coil 50 alone provides a damping action to eliminate vibration of the ends of the thermostatic members 13 and 14 as they snap toward the detent. For this reason, the detent may be of non-magnetic material, or simply a coil if so desired with modified structures.

The detent member 51 has a pin 52 which is adapted to be secured in a hole in the base of the thermostat 12. It will be noted that this pin 52 is eccentric with respect to the detent 51. This is also true of the detent member 36 disclosed in Fig. 1. Such an eccentric arrangement of the detent permits adjustability of the distance between the ends of the thermostatic members 13 and 14 and the detent to render the thermostat more positive in operation. In this manner, the differential of operation of the switch may be adjusted, as well as adjusting the amount of damping obtained by the detent.

Operation

Assume that it is winter time and outdoor temperature is generally below 60°. At this time the thermostatic member 12 will operate to control the heating means. In the position shown, the thermostatic members 13 and 14 are in a satisfied condition indicating that the space temperature is at or slightly above the desired temperature. As the temperature in the space falls, the bimetallic members 13 and 14 will warp toward the left as viewed in Fig. 1 and set up a stress tending to move the lower end thereof into engagement with the contact 32. However, such movement will be restrained by reason of the fact that a flux path is completed from the magnet 22 through the thermostatic member 13, the detent 36 and the thermostatic member 14 back to the magnet 22. However when sufficient stress is built up to overcome this attraction the lower ends of the members 13 and 14 will snap away from proximity to the detent 36 and into engagement with the contact 32. At this time the magnetic flux path will be traced from the magnet 22 through thermostatic element 13, the bracket 34, thermostatic element 14 back to the magnet 22. Hence, the bracket will serve to cause the contact 32 to be engaged by the contact 31 with a desirable high contact pressure. When the contacts 31 and 32 are in engagement, the heating means 10 will be energized through the following circuit, from line conductor 41, the conductor 40, the bridging member 30, contacts 31 and 32, conductor 43, heating means 10 and conductor 44 back to the other line wire 42.

When the heat generated by the heating means is delivered to the space, the condition responsive elements 13 and 14 will respond thereto and set up a force tending to move the lower ends of these elements toward the right. This force will be resisted by the magnetic attraction of the ends of elements 13 and 14 to the bracket member 36. However, when sufficient force is built up in the members 13 and 14, this attraction will be overcome and the lower ends of the elements 13 and 14 snap back toward the detent 36. As the lower ends of elements 13 and 14 approach the detent, the magnetic attraction thereto will be such as to prevent the lower ends of the members 13 and 14 from snapping way across into engagement with the contacts 33.

In order to increase the magnetic attraction to the detent, the detent 51 may be substituted therefor. This detent 51 having the conductor 50 wound therearound will cause the snubbing action to be enhanced by reason of the fact that an electric current will be caused to flow through the winding 50 as the lines of flux are cut thereby to form an assisting magnet of the detent 51. Also the force of the bimetallic members will be dissipated as flux lines are cut.

If a detent of non-magnetic material is used, the damping action is somewhat different in that the damping force is obtained only by cutting flux lines. Also, the snap action making of the contacts is different in that the bimetallic members 13 and 14 will move slowly toward the brackets 34 and 35 until the magnetic attraction thereto causes a snap action.

Assume now that it is summer time and the average outdoor temperature is above 80 degrees. At this time it is desired that the cooling means be operated by the thermostatic element 12. In the position shown in the drawing, the thermostatic members 13 and 14 are in the satisfied position, that is, the temperature within the space is at or slightly below a predetermined desired value. Assume now that the temperature in the space begins to rise. At this time the lower ends of members 13 and 14 will tend to move toward the right. This movement will be prevented by reason of the fact that the lower ends of the elements 13 and 14 are adjacent the detent 36. However, when the force is such as to overcome this attraction the lower ends will move with a snap action so that the contact 31 will engage the contact 33. At this time the flux path will be completed through the members 13 and 14 and the bracket 35. In opening the circuit when the space temperature is lowered, the lower ends of the members 13 and 14 will move away from the bracket 35 with a snap action, the same as pointed out in connection with the breaking of the circuit to the heating means. The circuit for the cooling means may be traced from the line conductor 41 through conductor 40, contacts 31 and 33, conductor 46, cooling means 11 and conductor 47 back to the other line wire 42.

If a modified detent is used, the action will be the same as pointed out above in connection with the discussion of operation on the heating cycle.

While I have shown and discussed certain forms which my invention may take, it will be apparent to those skilled in the art that many other modifications thereof may be evolved. Therefore, I wish not to be limited in my invention only to that form shown and described but by the scope of the appending claims and the prior art.

I claim as my invention:

1. A control device comprising a magnet having first and second poles, an elongated movable element of magnetic material connected at one of its ends to the first of said poles, an armature of magnetic material adjacent the other end of said element and cooperable therewith to produce a magnetic snap action, and magnetic means for completing the flux path from said first pole through said element and said armature back to said second pole.

2. A control device comprising a magnet having first and second poles, an elongated movable element connected at one of its ends to the first of said poles, an armature of magnetic material adjacent the other end of said element and cooperable therewith to produce a magnetic snap action, magnetic means for completing the flux path from said first pole through said element and said armature back to said second pole, a movable electrical contact carried by said last end of said element, and a stationary contact adapted to cooperate with said movable contact to open and close a circuit as said end is magnetically snap actuated.

3. A thermostat comprising a magnet, a pair of elongated bimetallic elements of magnetic material parallelly arranged with a first end of one element connected to one pole of said magnet and a first end of the other element connected to the other pole thereof, and an armature located adjacent the second ends of said elements arranged so as to bridge the space between them, said armature being adapted to complete a flux path between the poles of said magnet through said elements so that said elements will move with a snap action upon temperature variations tending to warp them towards and away from said armature.

4. A thermostat comprising a magnet, a pair of elongated bimetallic elements of magnetic material parallelly arranged with a first end of one element connected to one pole of said magnet and a first end of the other element connected to the other pole thereof, a first armature located adjacent the second ends of said elements arranged so as to bridge the space between them, said first armature being adapted to complete a flux path between the poles of said magnet through said elements so that said elements will move with a snap action upon temperature variations tending to warp them toward and away from said armature, and a second armature arranged similarly as the first armature but upon the opposite side of said elements, said second armature also providing a snap actuating flux path through said elements to said magnet.

5. A thermostat comprising a magnet, a pair of elongated bimetallic elements of magnetic material parallelly arranged with a first end of one element connected to one pole of said magnet and a first end of the other element connected to the other pole thereof, a first armature located adjacent the second ends of said elements arranged so as to bridge the space between them, said first armature being adapted to complete a flux path between the poles of said magnet through said elements so that said elements will move with a snap action upon temperature variations tending to warp them toward and away from said armature, a second armature arranged similarly as the first armature but upon the opposite side of said elements, said second armature also providing a snap actuating flux path through said elements to said magnet, and a detent of magnetic material located adjacent the ends of said elements so as to complete a flux path through said elements, said detent being disposed between said armatures adjacent the path of movement of said second ends of said element.

6. A thermostat comprising a magnet, a pair of elongated bimetallic elements of magnetic material parallelly arranged with a first end of one element connected to one pole of said magnet and a first end of the other element connected to the other pole thereof, a first armature located adjacent the second ends of said elements arranged so as to bridge the space between them, said first armature being adapted to complete a flux path between the poles of said magnet through said elements so that said elements will move with a snap action upon temperature variations tending to warp them toward and away from said armature, a second armature arranged similarly as the first armature but upon the opposite side of said elements, said second armature also providing a snap actuating flux path through said elements to said magnet, a detent of magnetic material located adjacent the ends of said elements so as to complete a flux path through said elements, said detent being disposed between said armatures adjacent the path of movement of said second ends of said element, and a short circuited coil of electrical conducting material wound around said detent to retard said ends of said elements by electrical inductance as said ends move adjacent said detent.

7. A thermostat comprising a magnet, a pair of elongated bimetallic elements of magnetic material parallelly arranged with a first end of one element connected to one pole of said magnet and a first end of the other element connected to the other pole thereof, a first armature located adjacent the second ends of said elements arranged so as to bridge the space between them, said first armature being adapted to complete a flux path between the poles of said magnet through said elements so that said elements will move with a snap action upon temperature variations tending to warp them toward and away from said armature, a second armature arranged similarly as the first armature but upon the opposite side of said elements, said second armature also providing a snap actuating flux path through said elements to said magnet, and a detent comprising convolutions of wire arranged so that movement of said second ends of said bimetallic elements adjacent said convolutions will induce an electrical current therein, said detent being disposed between said armatures adjacent the path of movement of said second ends of said element.

8. A thermostat comprising a magnet, a pair of elongated bimetallic elements of magnetic material parallelly arranged with a first end of one element connected to one pole of said magnet and a first end of the other element connected to the other pole thereof, an armature located adjacent the second ends of said elements arranged so as to bridge the space between them, said armature being adapted to complete a flux path between the poles of said magnet through said elements so that said elements will move with a snap action upon temperature variations tending to warp them towards and away from said armature, and control means operated by said snap action.

9. A thermostat comprising a magnet, a pair of elongated bimetallic elements of magnetic material parallelly arranged with a first end of one element connected to one pole of said magnet and a first end of the other element connected to the other pole thereof, an armature located adjacent the seond ends of said elements arranged so as to bridge the space between them, said armature being adapted to complete a flux path between the poles of said magnet through said elements so that said elements will move with a snap action upon temperature variations tending to warp them towards and away from said armature, control means operated by said snap action, a second armature arranged similarly as the first armature but upon the opposite side of said elements, said second armature providing a second snap actuating flux path through said elements to said magnet, and control means operated by said second snap action.

10. A thermostat comprising a magnet, a pair of elongated bimetallic elements of magnetic material parallelly arranged with a first end of one element connected to one pole of said magnet and a first end of the other element connected to the other pole thereof, an armature located adjacent the second ends of said elements arranged so as to bridge the space between them, said armature being adapted to complete a flux path between the poles of said magnet through said elements so that said elements will move with a snap action upon temperature variations tending to warp them towards and away from said armature, control means operated by said snap action, a second armature arranged similarly as the first armature but upon the opposite side of said elements, said second armature providing a second snap actuating flux path through said elements to said magnet, control means operated by said second snap action, and a detent of magnetic material located adjacent the ends of said elements so as to complete a flux path through said elements, said detent being disposed between said armatures adjacent the path of movement of said second ends of said elements and adapted to cooperate magnetically therewith.

11. A thermostat comprising a magnet, a pair of elongated bimetallic elements of magnetic material parallelly arranged with a first end of one element connected to one pole of said magnet and a first end of the other element connected to the other pole thereof, and three armatures located adjacent the second ends of said elements, said armatures independently completing flux paths as said thermostats move under the variations in temperature to render said thermostat snap acting into and out of three positions.

12. A thermostat comprising a magnet, a pair of elongated bimetallic elements of magnetic material parallelly arranged with a first end of one element connected to one pole of said magnet and a first end of the other element connected to the other pole thereof, and a plurality of armatures located adjacent the second ends of said elements, said armatures independently completing flux paths as said thermostats move under the variations in temperature to render said thermostat snap acting into and out of a plurality of positions.

13. A thermostat comprising a magnet, a pair of elongated bimetallic elements of magnetic material parallelly arranged with a first end of one element connected to one pole of said magnet and a first end of the other element connected to the other pole thereof, three armatures located adjacent the second ends of said elements, said armatures independently completing flux paths as said thermostats move under the variations in temperature to render said thermostat snap acting into and out of three positions, and electrical control means operated by the snap actions of said thermostats.

14. A control device comprising a magnet, an elongated member of flux carrying magnetic material with one end thereof adjacent said magnet, an armature of magnetic material located adjacent the other end of said member, said last end being warped towards and away from said armature by variations in a variable condition and movable with a snap action because of the magnetic attraction of said end to said armature, and damping means spaced from said armature adjacent the path of movement of said member for damping the snap action thereof.

15. A control device comprising a magnet having first and second poles, an elongated movable element of magnetic material connected at one of its ends to the first of said poles, an armature of magnetic material adjacent the other end of said element and cooperable therewith to produce a magnetic snap action, magnetic means for completing the flux path from said first pole through said element and said armature back to said second pole, and damping means also adjacent the other end of said element for damping the snap action thereof.

16. A thermostat comprising a magnet, a pair of elongated bimetallic elements of magnetic material parallelly arranged with a first end of one element connected to one pole of said magnet and a first end of the other element connected to the other pole thereof, an armature located adjacent the second ends of said elements arranged so as to bridge the space between them, said armature being adapted to complete a flux path between the poles of said magnet through said elements so that said elements will move with a snap action upon temperature variations tending to warp them towards and away from said armature, and damping means adjacent the second ends of said elements for damping the snap action thereof.

17. A thermostat comprising a magnet, a pair of elongated bimetallic elements of magnetic material parallelly arranged with a first end of one element connected to one pole of said magnet and a first end of the other element connected to the other pole thereof, a first armature located adjacent the second ends of said elements arranged so as to bridge the space between them, said first armature being adapted to complete a flux path between the poles of said magnet through said elements so that said elements will move with a snap action upon temperature variations tending to warp them toward and away from said armature, a second armature arranged similarly as the first armature but upon the opposite side of said elements, said second armature also providing a snap actuating flux path through said elements to said magnet, and damping means adjacent the second ends of said elements located between said armatures for damping the snap movement of said elements from both of said armatures.

18. In a condition responsive device, means responsive to variations in the value of a condition including a magnetized member having three desired positions closely spaced to each other, one of said positions lying between the other two, three relatively fixed magnetic members cooperable with said magnetized member to hold it in each of its three positions, and means for adjusting the holding action of that one of said magnetic members which holds said magnetized member in its intermediate position.

19. In a condition responsive device, means responsive to variations in the value of a condition including a magnetized member having three desired positions closely spaced to each other, one of said positions lying between the other two, a pair of magnetic members cooperable with said magnetized member to hold it in its extreme positions, and means cooperable with said magnetized member to restrain its moving through its intermediate position, said last means being rendered active as a result of movement of said magnetized member and being inactive when said magnetized member is stationary.

20. In a condition responsive device, means responsive to variations in the value of a condition including a magnetized member having three desired positions closely spaced to each other, one of said positions lying between the other two, a pair of magnetic members cooperable with said magnetized member to hold it in its extreme positions, and means cooperable with said magnetized member to restrain its moving through its intermediate position, said last means comprising a conductor forming a closed circuit which is cut by the lines of force of said magnetized member whenever the same moves through its intermediate position.

ALWIN B. NEWTON.